United States Patent Office 2,727,822
Patented Dec. 20, 1955

2,727,822

PROCESS OF MAKING A WATER-SOLUBLE INFANT CEREAL FOOD AND THE RESULTING PRODUCT

Frank T. Kimball, South Norwalk, Conn., and Reuel A. Benson, New York, N. Y.

No Drawing. Application July 11, 1952, Serial No. 298,464

5 Claims. (Cl. 99—80)

This invention relates to an improved infant food derived from cereal seeds which has all the natural mineral and vitamin content of the cereal seed and the extraordinary property of almost instantly dissolving in cold water or milk to form a smooth paste.

Although our invention is applicable to any natural cereal seed it can best be described in connection with whole unpolished rice. Unpolished rice has a number of important advantages over other cereal foods such as its vitamin and carbohydrate content but it has not been extensively used in infant feeding because it takes time to prepare and when administered the infant has difficulty in breaking down the granules and in digesting the fibrous material of the rice. Since the fibrous material contains most of the natural minerals and vitamins the infant does not get full nutritional value.

We have now discovered that when finely divided particles of whole unpolished rice are precooked and centrifuged under certain prescribed conditions it is possible to make a readily digestible rice cereal out of the resulting material which contains substantially all the minerals, vitamins and edible carbohydrates of unpolished rice. The user has only to mix the dry cereal with the desired amount of cold water or milk to form a paste suitable for use in infant feeding and since our product is completely water soluble it affords the infant rapid nutritional energy.

In the practice of our invention whole unpolished rice in finely divided form is slurried in water and then gently heated in a suitable vessel until the rice particles are partially cooked. Heating is discontinued before the mixture thickens appreciably, that is, before the starch is pasted, and it is preferably discontinued in about one-third the time usually required for pasting rice. The slurry at this time should have the consistency of light syrup but if it does not pour easily it is mixed with additional water so that it will readily flow from the vessel. The slurry is then centrifuged and allowed to stand until it separates into three distinct layers. The top layer is a liquid, the middle layer is a custard-like material, and the bottom layer or residue contains the indigestible and water insoluble fibrous material of the bran and hull. The two top layers are set aside and the residue is repeatedly cooked and centrifuged until the extract is free of carbohydrates. The residue is then discarded and all of the extracted material is combined and thoroughly mixed until a smooth homogeneous paste is formed which is dried on a sand bath or hot roll. The resulting product is in the form of flakes of about one inch in diameter which may be packaged as such or pulverized and then packaged. The flakes contain substantially all of the digestible carbohydrates, water soluble minerals and natural vitamins of unpolished rice.

If a complete and balanced infant food is desired a material high in animal or vegetable protein such as casein or soy flour may be included and mixed with the rice flakes. For this purpose we prefer to use soy flakes made from whole soy beans which have been put through our process as above described. For best results we intimately mix the raw unpolished rice and soy beans and then process the two ingredients together. When this is done the vitamins and oils are embedded in the carbohydrate flakes which protects them from oxidation. This gives our cereal excellent storage characteristics.

For the purpose of illustration and in order to point out the best method now known to us for carrying out our invention the following specific examples are given.

Example 1

Approximately 15 grams of whole unpolished rice are crushed and pulverized until the particles are in a finely divided state. Particle size is not important but the smaller the particles are the easier it is to extract the water soluble material later on in our process. The ground rice is then slurried in water and placed in any suitable vessel adapted for heating. We have achieved excellent results with the slow even heat of a double boiler. The slurry is heated for about ten minutes at a temperature below 70° C. to partially cook the rice and break down its fibrous structure. For best results we keep the temperature of the slurry below 70° C. in order to avoid decomposition of the natural vitamins. In general, heating should be discontinued before the rice is completely cooked and pasted. The slurry is then centrifuged at a speed of 2000 to 2500 R. P. M. and allowed to stand until it separates into layers. The top layers are set aside and the bottom layer of residue is repeatedly cooked and centrifuged until the extract is free of carbohydrates. This is readily determined by the standard iodine test for starch. The extracted material is combined and mixed to form a smooth homogeneous paste which is dried on a hot sand bath. 4 grams of water soluble rice flakes were recovered which is equivalent to a 27% yield. The thiamine content of the product averages about 490 mgs. per 100 grams as compared to the thiamine content of the raw unpolished rice which averaged 318 mgs. per 100 grams.

Example 2

The above described process was repeated using a mixture of 7½ grams of unpolished rice and 7½ grams of dry whole soy beans. 5 grams of water soluble flakes were recovered representing a yield of 28%. For a well balanced infant food we prefer to mix approximately 1 part of soy bean with approximately 4 parts of rice. The resulting cereal food is of particular advantage in infant feeding because allergic reactions in children to rice and soy flour are rare. The soy bean protein supplies all the essential amino acids required for growth and development so that no synthetic vitamin or mineral additions are necessary and the soy protein is readily digested and absorbed because of the catalytic action of rice on such foods.

Although the above description is primarily directed to rice and soy cereal seed it will be clearly understood that our invention broadly includes any variety of natural cereal seed or edible vegetable matter. For example:

Example 3

The process of Example 1 was followed using a mixture of 15 grams of whole wheat. 5 grams of water soluble flakes were recovered representing a yield of 33%.

Example 4

15 grams of oats were put through the process of Example 1 and 5 grams of water soluble flakes were recovered representing a yield of approximately 33%.

The products of Examples 3 and 4 make an excellent adult breakfast cereal and if desired figs, raisins or nuts may be added for additional flavor and nutritional value.

It will be understood that it is intended to cover all changes and modifications of the examples of our invention herein chosen for the purpose of illustration which do not constitute departures from the spirit and scope of the invention.

What is claimed is:

1. In making a cereal food containing water soluble minerals, vitamins, edible carbohydrate, and protein of natural cereals, the process which comprises heating an aqueous slurry of finely divided particles of the selected cereal until it is partially cooked at a temperature below about 70° C., discontinuing the heating before the starch content of the cereal is pasted, centrifuging the resulting partially cooked slurry to separate indigestible and water insoluble fibrous material from the more fluid portions of the product, and then drying the said more fluid portions to produce a cereal food suitable for infant feeding.

2. The process of claim 1 which includes recooking the said indigestible and water insoluble fibrous material at the said temperature and recentrifuging and separating the products of the recooking.

3. The process of claim 1 in which the cereal used is whole unpolished rice in milled condition.

4. A cereal food product comprising the water dispersible components of the cereal, mineral, vitamin, and edible carbohydrate and protein of such cereal, the food being in partially cooked condition, the starch if any therein being in unpasted condition, and the food being the product of the process of claim 1.

5. The food of claim 4, the components recited being derived from whole unpolished rice and soy beans.

References Cited in the file of this patent

UNITED STATES PATENTS

| | | |
|---|---|---|
| 1,990,329 | Johnson et al. | Feb. 5, 1935 |
| 2,396,592 | Möller | Mar. 12, 1946 |
| 2,559,022 | Lolkema | July 3, 1951 |